United States Patent
Hamelink et al.

(10) Patent No.: US 7,461,583 B2
(45) Date of Patent: Dec. 9, 2008

(54) VARIABLE TENSION RING MECHANISM

(75) Inventors: Joseph C. Hamelink, North Muskegan, MI (US); Jack W. Lewis, Walker, MI (US); David R. Stamy, Twin Lake, MI (US)

(73) Assignee: Mahle Engine Components USA, Inc., Muskegon, MI (US)

( * ) Notice: Subject to any disclaimer, the term of this patent is extended or adjusted under 35 U.S.C. 154(b) by 179 days.

(21) Appl. No.: 11/459,188

(22) Filed: Jul. 21, 2006

(65) Prior Publication Data
US 2008/0017025 A1    Jan. 24, 2008

(51) Int. Cl.
*F16J 1/06*       (2006.01)
*F02B 75/00*   (2006.01)
(52) U.S. Cl. .............................. 92/201; 92/207; 277/470
(58) Field of Classification Search ............. 92/201, 92/203, 207, 208; 277/470, 486, 496, 497, 277/906
See application file for complete search history.

(56) References Cited

U.S. PATENT DOCUMENTS

| 4,926,811 | A * | 5/1990 | Parsons ..................... 92/201 |
| 5,058,488 | A * | 10/1991 | Cullen et al. ................ 92/208 |
| 6,484,622 | B1 * | 11/2002 | Hamelink et al. ............ 92/201 |
| 6,860,485 | B2 * | 3/2005 | Masuyama et al. .......... 277/471 |

* cited by examiner

*Primary Examiner*—Thomas E Lazo
(74) *Attorney, Agent, or Firm*—Rader, Fishman & Grauer PLLC (57) ABSTRACT

A piston assembly is described including a connecting rod and a piston head secured to the connecting rod and in operational communication with the connecting rod. The piston head has a circumferential groove extending inwardly from an exterior surface of the piston head. The piston head further has a compression mechanism aperture disposed proximate the groove. An oil ring expander is disposed generally within the groove. The expander includes a gap between a first expander end and a second expander end. The gap is proximate the compression mechanism aperture. At least one lever arm is in mechanical communication with the connecting rod. The at least one lever arm has a tab disposed between the first expander end and the second expander end.

19 Claims, 11 Drawing Sheets

FIG. 26

VARIABLE TENSION RING MECHANISM

TECHNICAL FIELD

A piston assembly for an internal combustion engine is described, and more particularly, a mechanism for improving the piston assembly and its operation.

BACKGROUND

Compression rings form a seal between a piston and a cylinder wall. They are adapted to use combustion pressure to force the ring against the cylinder wall and against the bottom edge of a ring groove. Typically, a top ring is the primary seal with a second ring being used to seal any small amount of pressure that may reach it.

During a power stroke, the pressure generated by the ignited and expanding air/fuel mixture is applied between the inside of the ring and the piston groove. This forces the ring into full contact with the cylinder walls. The same combustion pressure is applied to the top of the ring, forcing it against the bottom of the ring groove. The combustion pressure and the compression ring act together to form a ring seal.

Oil is constantly being applied to the cylinder walls. The oil is used for lubrication as well as to clean the cylinder wall of carbon and dirt particles. This oil bath also aids in cooling the piston. Controlling this oil bath is the function of the oil ring. The two most common types of oil rings are a segmented oil ring and a cast-iron oil ring. Both types of rings are slotted so that excess oil from the cylinder wall can pass through the ring. The oil ring groove of the piston is also slotted. After the oil passes through the ring, it can then pass through slots in the piston and return to the oil sump through an open section of the piston.

Those skilled in the art will appreciate that the pistons of internal combustion engines in today's modern vehicles are generally provided with three sets of piston rings for preventing, between the pistons and cylinder bores, leakage of gas to the crankcase, and of oil to the piston head.

As a practical matter, it is well known that the piston rings of modern engines, although substantially improved over engines of prior vintage, are in some ways still lacking. For example, the upper compression ring is designed one hundred percent for the sealing of the gases of combustion to prevent their entry into the engine crankcase. Generally the lower compression ring is designed to provide about forty percent of the noted gas sealing function, and approximately sixty percent of an oil scrapping function. The latter prevents oil from traveling up to the top of the piston head to create the classic smoking tailpipe or "blue smoke" syndrome. Finally, most modern pistons include a bottom oil control ring that includes at least one rail used for aggressive scraping of oil to force the same back into the crankcase. Normally sharing the bottom piston ring groove with the at least one rail is an expander ring formed of an undulating, sinusoidal-shaped spring steel for the purpose of loading the rail appropriately, so that the rail may be effective in its scraping function as the piston reciprocates within its cylinder bore. Hence the combination of the rail and the expander is referred to as an oil control ring.

It will thus be appreciated that various piston rings have unique design functions for addressing either of the noted prevention of leakage of gas to the crankcase, or of oil to the piston head. Generally, as the rings wear during their continuous scraping against the cylinder walls and associated rocking within piston ring grooves, issues of blow-by of gases into the crankcase, and oil leakage into combustion chamber areas, become significant. Most rings incorporate a tangential tension in their initial structure that can generate a force (as measured by a spring band) against the cylinder walls. Unfortunately, this force does not vary, and tends to apply the same force on both upward and downward strokes of the piston.

Particularly with respect to the scraper function of the bottom oil control ring, it would be quite desirable to provide a variable oil ring compression control against the cylinder walls including a variable tension oil ring assembly robust enough to power cylinder G-forces that would add strength and durability to all pieces.

SUMMARY

In an illustrative embodiment, a piston assembly is employed, including a connecting rod and a piston secured to the connecting rod and in operational communication with the connecting rod. The piston head has a circumferential groove extending inwardly from an exterior surface of the piston head. The piston head further has a compression-mechanism aperture disposed proximate the groove. An oil ring expander is disposed generally within the groove. The expander includes a gap between a first expander end and a second expander end. The gap is proximate the compression-mechanism aperture. At least one lever arm is in mechanical communication with the connecting rod. The at least one lever arm has a tab disposed between the first expander end and the second expander end.

BRIEF DESCRIPTION OF THE DRAWINGS

The features and inventive aspects of the present invention will become more apparent from the following detailed description, the appended claims, and the accompanying drawings, of which the following is a brief description:

DETAILED DESCRIPTION

Referring now to the drawings illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

Figure 1:
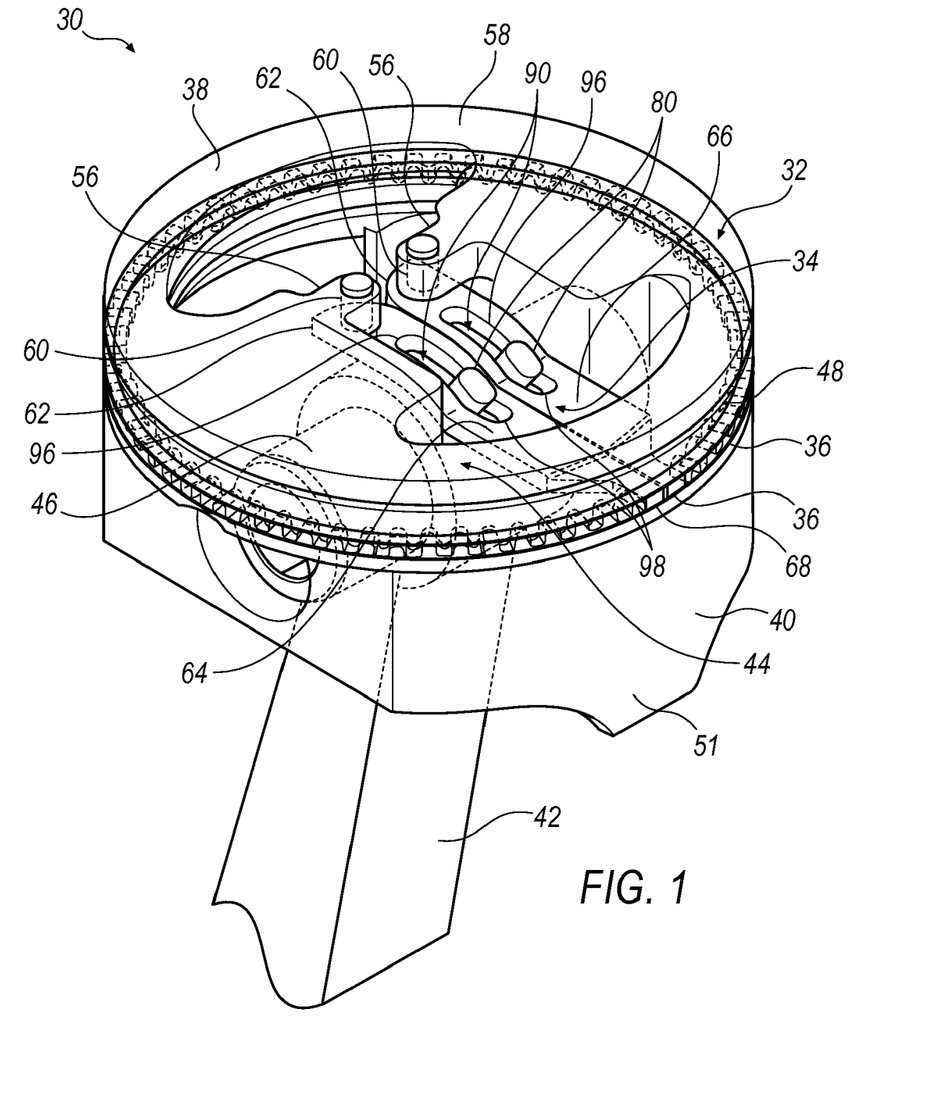
FIG. 1 is an elevated perspective view of one embodiment of a piston assembly employing a variable tension ring mechanism with the crown of the piston being removed fro clarity.

Referring now to FIG. 1, a variable tension ring mechanism 30 of a piston assembly 32 includes a compression mechanism 34 for maximizing radial pressure of a rail assembly 36 against an associated engine cylinder wall (not shown) on the downward stroke of the piston assembly 32. Conversely, upon the upstroke of the piston assembly 32, the pressure is reduced.

Thus, in FIG. 1, the piston assembly 32 includes a piston 38 having a piston skirt 40. The piston 38 is in operational communication with a connecting rod 42 that secures the piston assembly 32 for reciprocal motion in a cylinder bore (not shown). A first connecting rod end 44 is secured to the piston 38 by way of a wrist pin 46. The opposite end of the connecting rod 42 (not shown) is secured to an engine crankshaft (not shown) by a cap (not shown) as is well known. The connecting rod 42 converts rotary motion of the crankshaft into linear reciprocal motion of the piston assembly 32.

Referring to FIGS. 2-5, the piston 38 is formed, for example by casting, from any number of known metals, including aluminum alloys. The piston 38 includes at least one compression ring groove 49 and at least one oil ring groove 48, two being shown in FIG. 1. The compression ring groove 49 is adapted to receive at least a portion of the variable ring tension mechanism 30. The oil grooves 48 are adapted to receive at least one oil ring (not shown). A first compression groove 49a in the piston 38 is adapted to retain a first compression ring (not shown), which acts as a gas sealing medium to avoid admission of gases into the crankcase during reciprocal motion of the piston assembly 32. A second compression ring groove 49b may be provided to accommodate a second compression ring (not shown), which operates in concert with the first compression ring to facilitate the sealing function of gases, oil, and the like.

Figure 5:
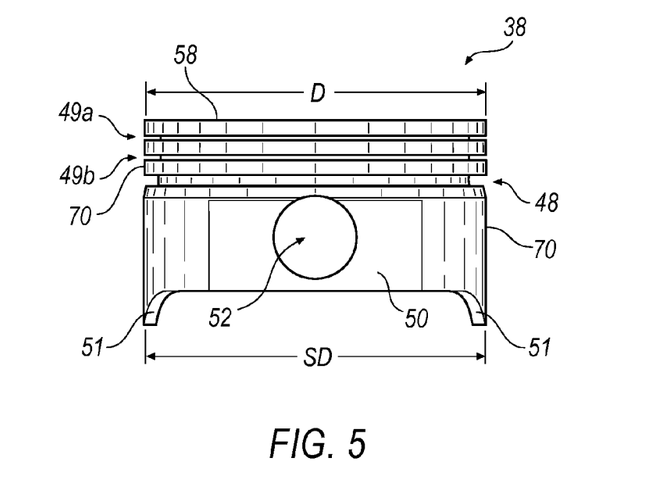
FIG. 5 is a side elevational view of the piston head of FIG. 2.
Figure 6:
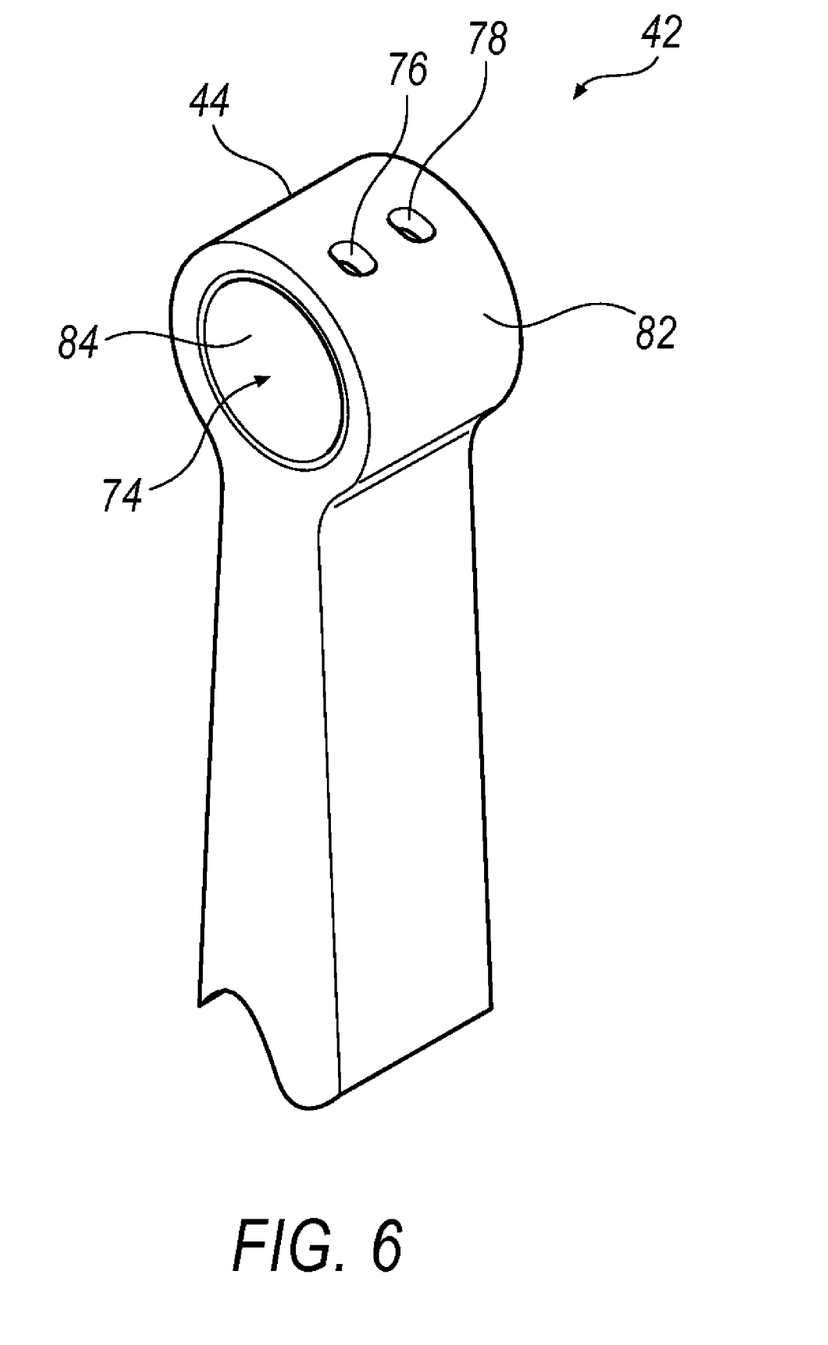
FIG. 6 is an elevational perspective view of a connecting rod of FIG. 1.
Figure 7:
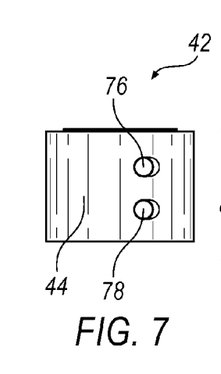
FIG. 7 is a top plan view of the connecting rod of FIG. 6.
Figure 8:
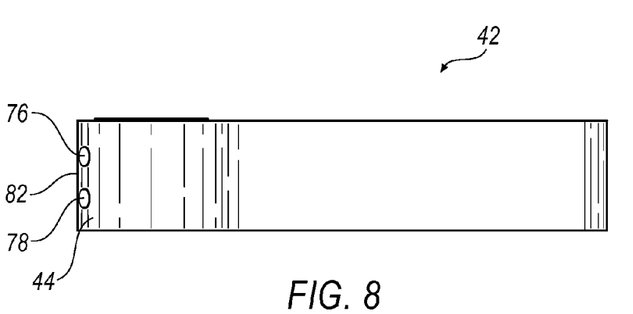
FIG. 8 is a side elevational view of the connecting rod of FIG. 6.
Figure 9:
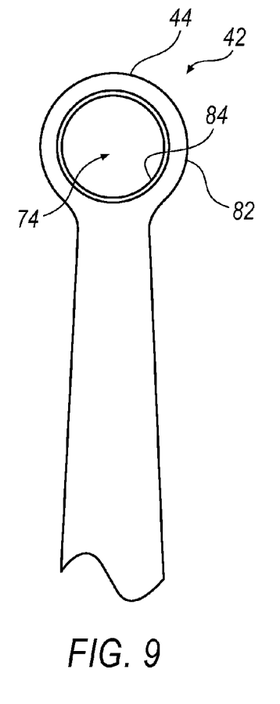
FIG. 9 is a front elevational view of the connecting rod of FIG. 6.

The piston 38 further includes at least one side panel 50 proximate the piston skirt 40. As illustrated in FIG. 5, the piston head has a diameter (D) that may be less than or equal to a skirt diameter (SD). The skirt may be a full skirt (not shown) or a partial or slipper skirt having at least one tab 51.

Figure 4:
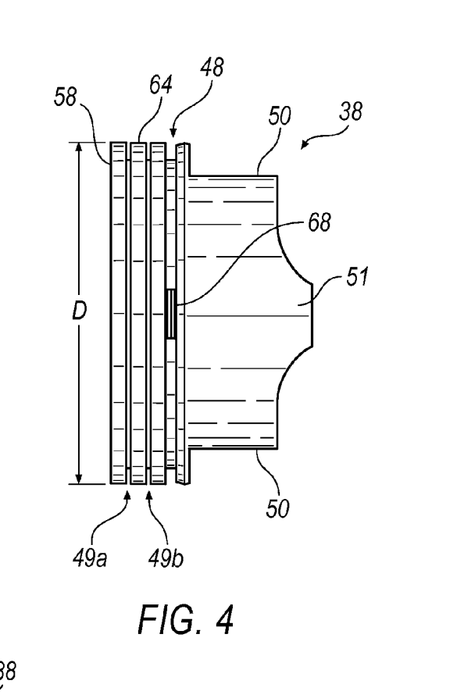
FIG. 4 is a front elevational view of the piston head of FIG. 2.

In FIG. 4, the side panels 50 are illustrated stepped down in transverse dimension from the piston head diameter D and have generally planar surfaces. However, any shape or contour of surface may be used. Each of the side panels 50 includes a pin aperture 52 adapted to receive the wrist pin 46 as illustrated in FIG. 1. The wrist pin 46 may rotate freely within or be secured relative to the pin aperture 52. The interior of the piston 38 may include a cavity 54 so that the weight of the piston 38 may be minimized.

Figure 2:
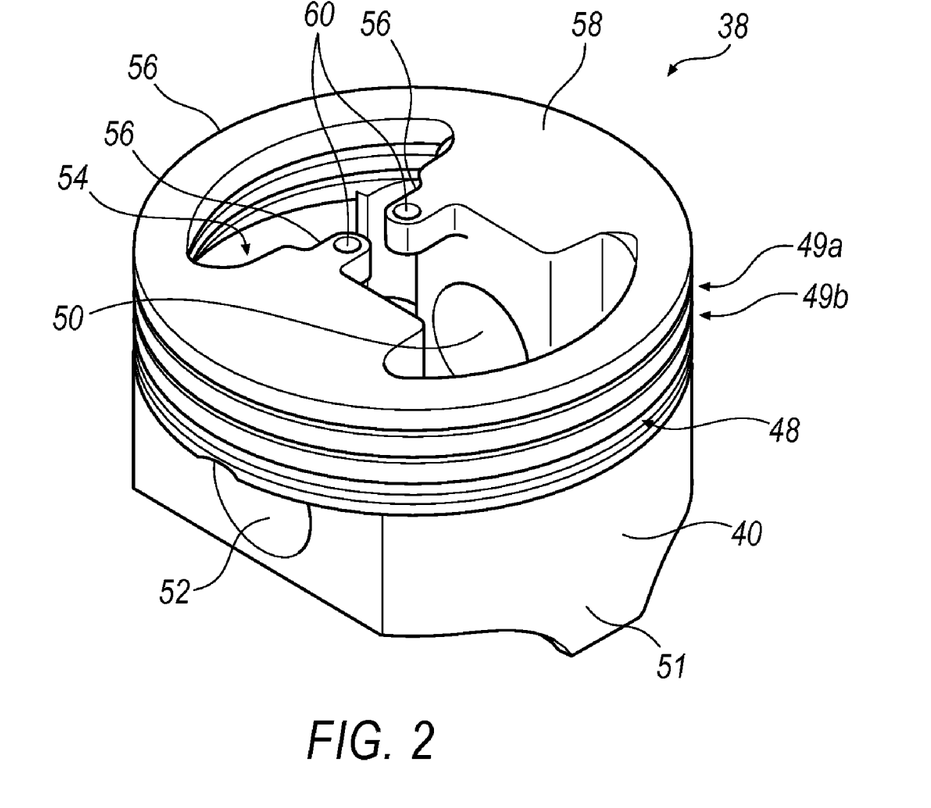
FIG. 2 is an elevational perspective view of a piston head of FIG. 1.
Figure 3:
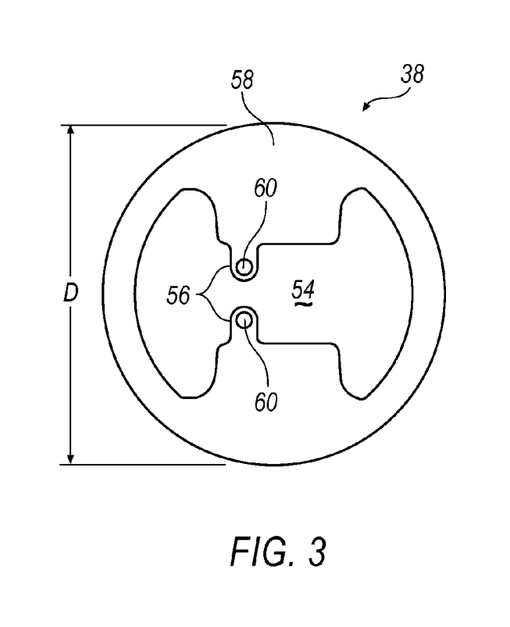
FIG. 3 is a top plan view of the piston head of FIG. 2.

As illustrated in FIGS. 1-3, a support structure for the compression mechanism 34 includes arms 56 extending into the cavity 54 from an upper surface 58 of the piston 38. Alternatively, the arms 56 may extend toward each other, forming one structure (not shown). In one embodiment, each arm 56 includes a pivot aperture 60 adapted to provide securement and pivoting motion for a first end 62 of each lever arm 64, 66 of the compression mechanism 34, as further discussed below. As illustrated in FIGS. 1 and 4, a compression mechanism aperture 68 is disposed within the compression ring groove 48 between an exterior head surface 70 and the cavity 54 of the piston 38 to allow movement of a second end 72 of the lever arms 64, 66.

Referring to FIGS. 6-9, the connecting rod 42 is illustrated as having a rod aperture 74 at the first connecting rod end 44. The rod aperture 74 is adapted to receive the wrist pin 46 of FIG. 1. The wrist pin 46 may be press-fitted or free-fitted in the rod aperture 74. The second connecting rod end (not shown) is used to attach the connecting rod 42 to the crankshaft (not shown), as is well known. The connecting rod 42 is used to transmit to the crankshaft the pressure applied to the piston 38. The connecting rod 42 is relatively strong and lightweight and may be formed from any high-strength metal, such as nodular steel, or high-strength alloy.

The connecting rod 42 further includes two connecting rod pin holes 76, 78, each adapted to receive and secure a connecting rod pin 80, as illustrated in FIG. 1. The connecting rod pin holes 76, 78 may be cavities having a predetermined depth or may be formed between an outer rod surface 82 and an inner rod surface 84, the inner rod surface 84 defining the rod aperture 74. The rod pin holes 76, 78 may be of shape and size related to the associated rod pin 80.

Figures 10, 11:
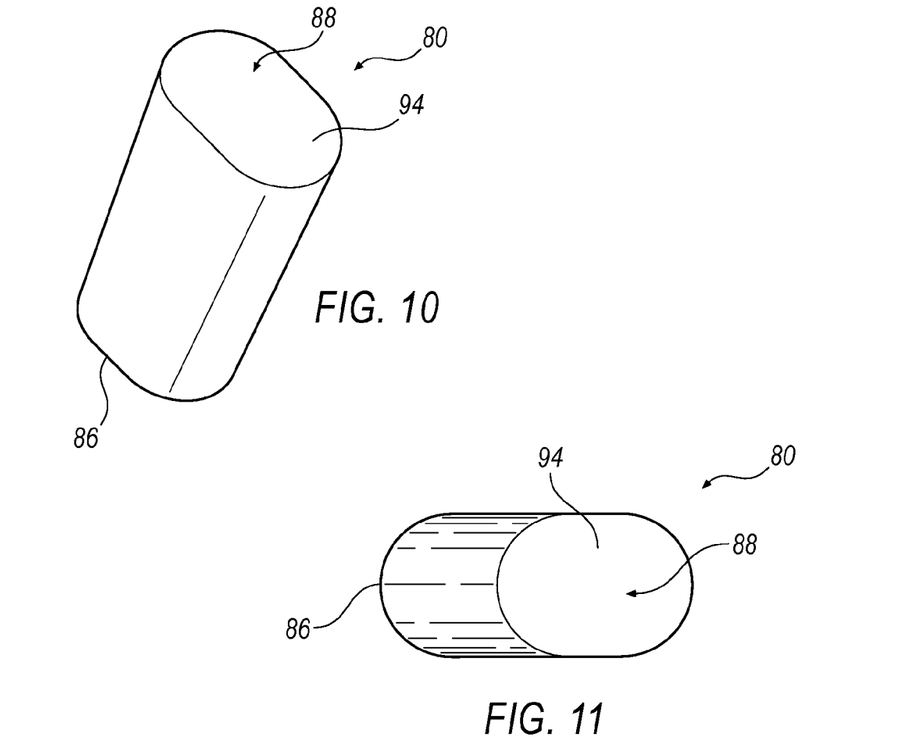
FIG. 10 is an elevational perspective view of a connecting rod pin of FIG. 1.
FIG. 11 is a top isometric view of the connecting rod pin of FIG. 10.
Figure 12:
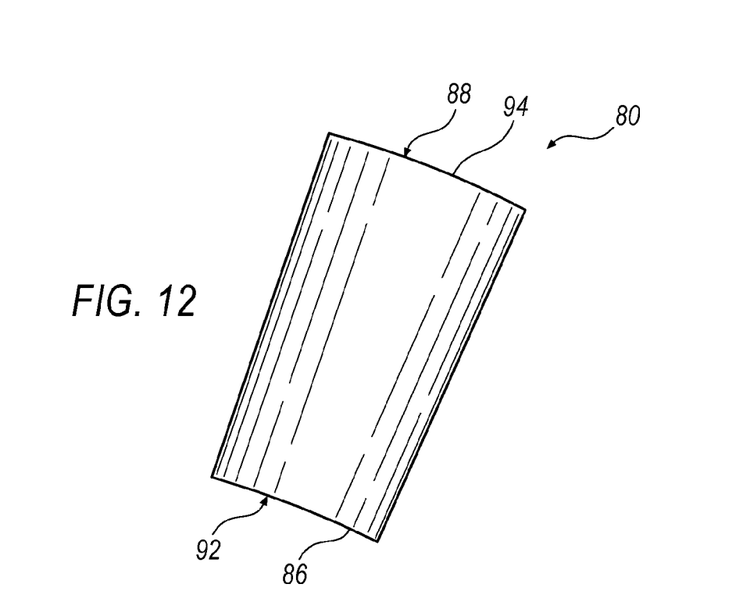
FIG. 12 is a side elevational view of the connecting rod pin of FIG. 10.
Figure 13:
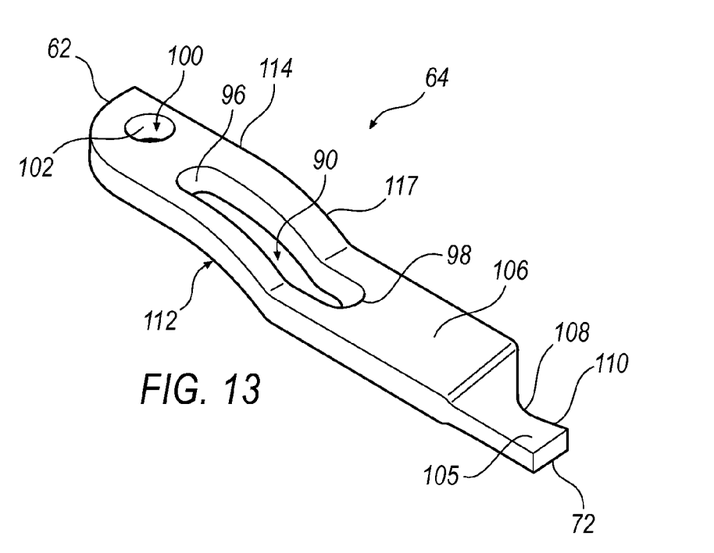
FIG. 13 is an elevational perspective view of a first lever arm of FIG. 1.
Figure 14:
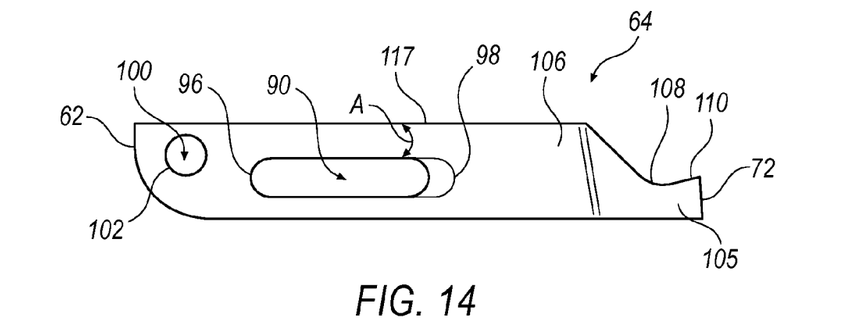
FIG. 14 is a top plan view of the first lever arm of FIG. 13.

Referring to FIGS. 10-12, the connecting rod pin 80 may be formed from any metal including a high-strength steel or high-strength alloy. A first rod pin end 86 is adapted to be received in the rod pin hole 76, 78, and a second rod pin end 88 is adapted to engage a lever arm slot 90, as illustrated in FIG. 1. A first rod pin end surface 92 and a second rod pin end surface 94 are illustrated as being generally rounded. However, the surfaces 92, 94 may include any shape and predetermined dimension. As illustrated in FIG. 1, the second rod pin end 88 is adapted to move between a first arm slot end 96 and a second arm slot end 98 during operational motion of the connecting rod 42, as further discussed below.

Figure 19:
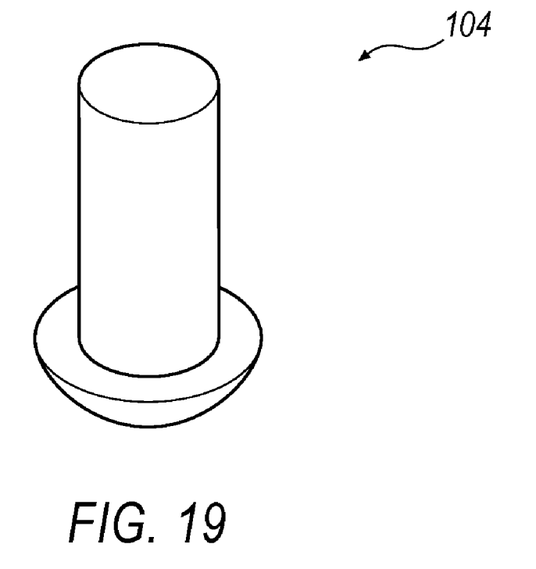
FIG. 19 is an elevational perspective view of a pivot pin of FIG. 1.
Figure 20:
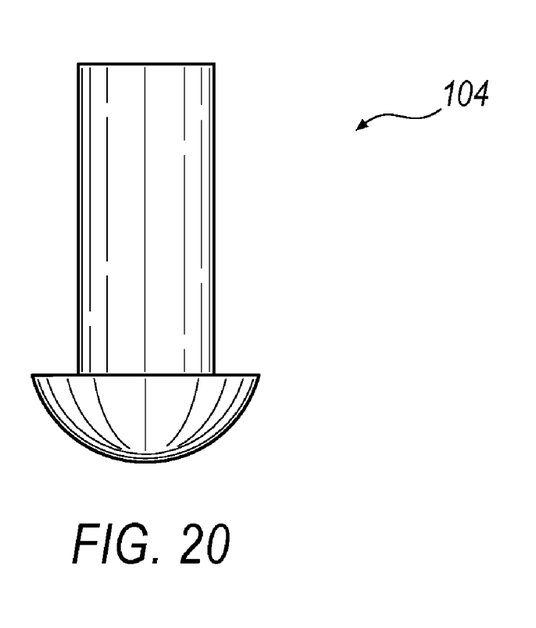
FIG. 20 is a side elevational view of the pivot pin of FIG. 19

Referring now to FIGS. 13-18, a first lever arm 64 and a second lever arm 66 are illustrated. In the embodiment shown, the first lever arm 64 is a mirror image of the second lever arm. For simplicity, only the first lever arm 64 will be described. The arm 64 includes the generally rounded first end 64 adapted for rotational operation at a pivot point 100. The pivot point 100 includes a pivot pin aperture 102 adapted to receive a pivot pin 104 illustrated in FIGS. 19-20. The pivot pin 104 is adapted to secure the lever arm 64 to the arm 56 of the piston 38 by being placed through the pivot pin aperture 102 and into the pivot aperture 60 of the piston 38, as illustrated in FIG. 1. The lever arm slot 90 and the connecting rod pin 80 are adapted to selectively move the lever arm 64 between a first arm position and a second arm position. The first arm position includes the lever arms 64, 66 being generally aligned and the second ends 72 of each lever arm 64, 66 being generally proximate, as illustrated in FIG. 1. The second arm position includes the second end 72 of each lever arm 64, 66 spaced a predetermined distance away from each other within the compression mechanism aperture 68 of the piston 38. The reciprocal motion of the connecting rod 42 moves the connecting rod pin 80 between the first arm slot end 96 and the second arm slot end 98 of the lever arm 64, causing the second end 72 of each lever arm 64, 66 to move between the first arm position and the second arm position described above.

Figure 15:
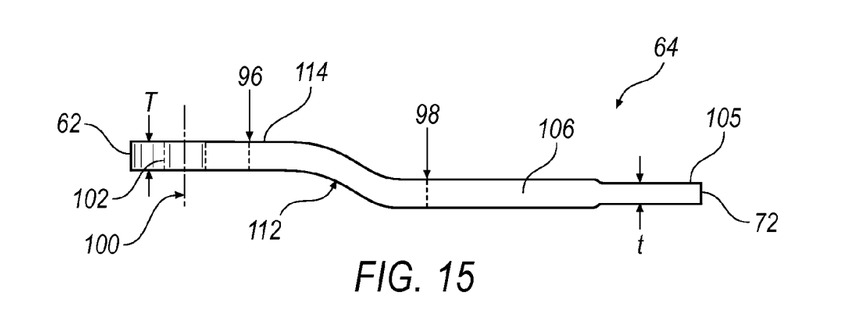
FIG. 15 is a side elevational view of the first lever arm of FIG. 13.
Figure 16:
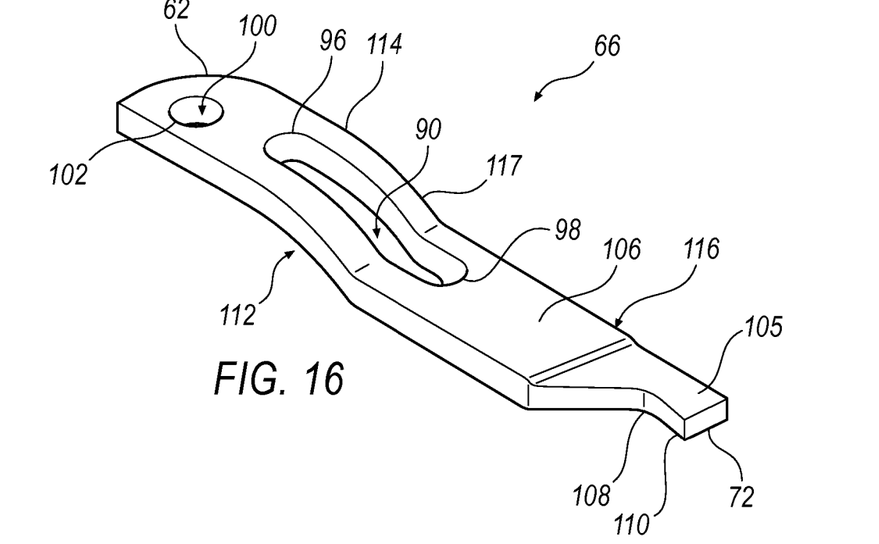
FIG. 16 is an elevational perspective view of a second lever arm of FIG. 1.
Figure 17:
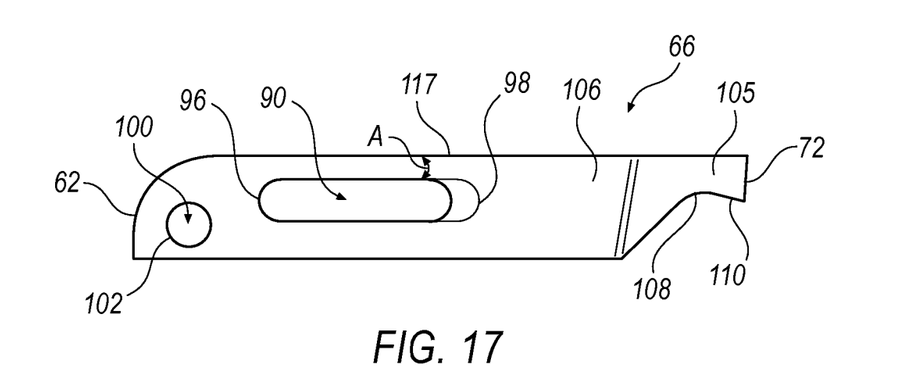
FIG. 17 is a top plan view of the second lever arm of FIG. 16.
Figure 18:
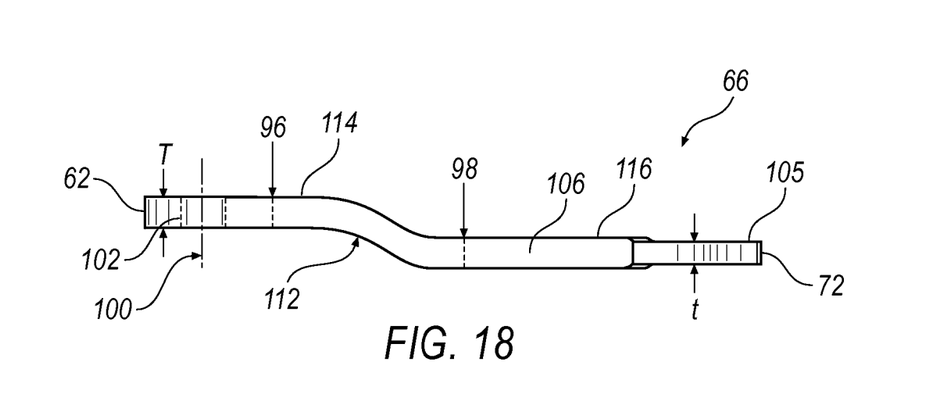
FIG. 18 is a side elevational view of the second lever arm of FIG. 16.

Each of the lever arms 64, 66 further includes a tab 105 extending from an arm body 106. The tab 105 has a generally rounded portion 108 and a lip 110. The rounded portion 108 and lip 110 are adapted to be inserted into the compression mechanism aperture 68 of the piston 38. The tab 105 thickness (t) is generally smaller than the arm body thickness (T), as illustrated in FIGS. 15 and 18. The lever arms 64, 66 further include a stepped portion having a generally rounded surface 112. The upper portion 114 of the arm body 106 is at a predetermined distance above the lower portion 116. The rounded surface 112 is adapted to rest above a surface of the first connecting rod end 44. The rounded surface 112 may also be contoured to generally conform to the surface of the first connecting rod end 44. The arm slot 90 should be angled (A) at a predetermined degree to an arm side 117 to facilitate the slight separation of the lever arms 64, 66 during the reciprocal motion of the connecting rod 42.

Figure 21:
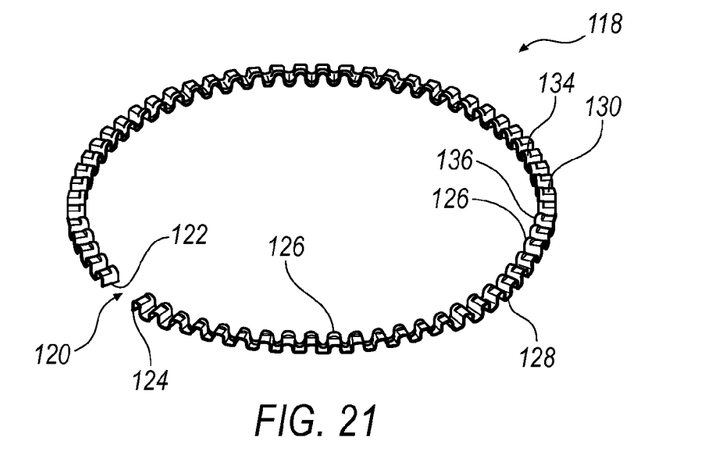
FIG. 21 is an elevational perspective view of an oil ring expander of FIG. 1.
Figure 22:
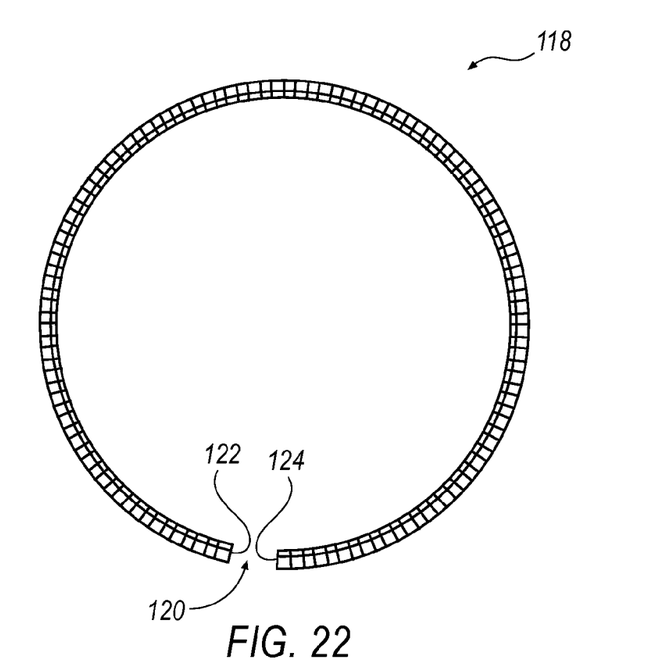
FIG. 22 is a top plan view of the oil ring expander of FIG. 21.
Figure 23:
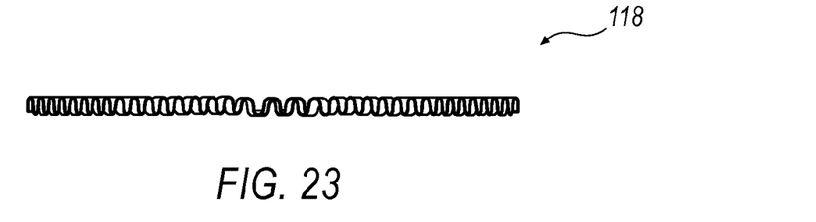
FIG. 23 is a side elevational view of the oil ring expander of FIG. 21.
Figure 24:
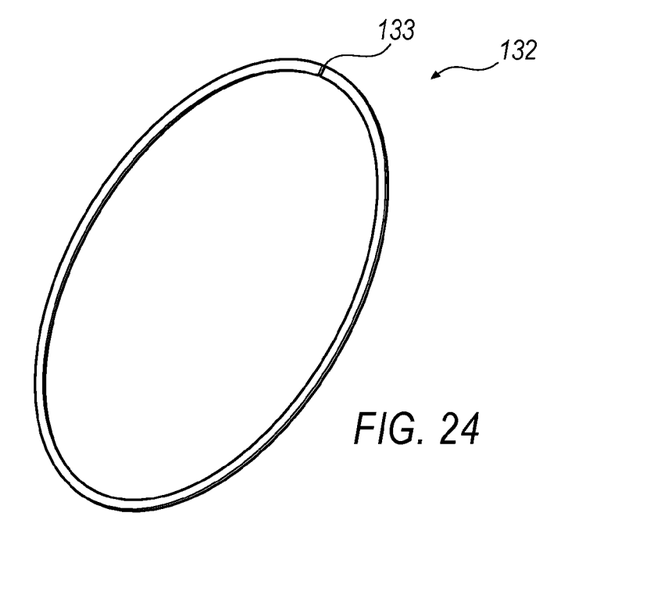
FIG. 24 is an elevational perspective view of a rail of FIG. 1.
Figure 25:
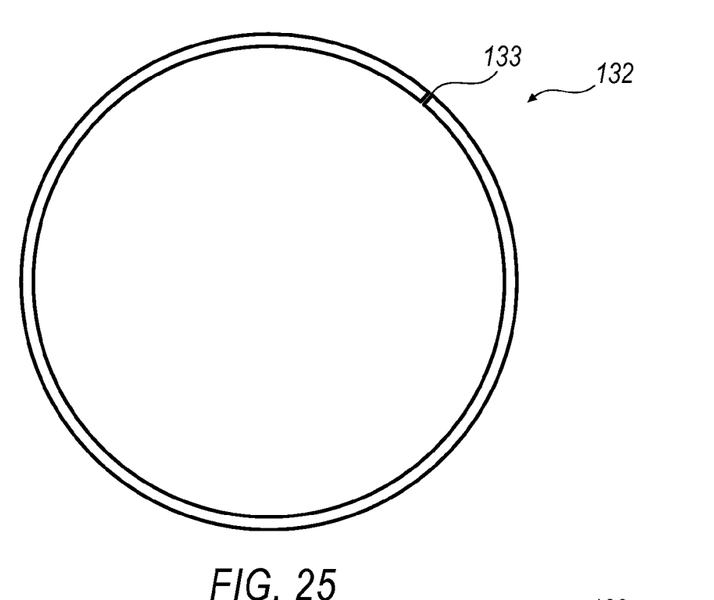
FIG. 25 is a top plan view of the rail of FIG. 24.
Figure 26:
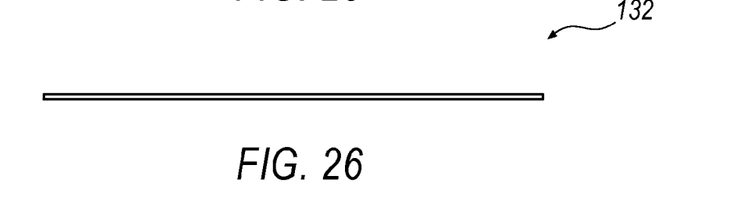
FIG. 26 is a side elevational view of the rail of FIG. 24.

Referring to FIGS. 21-23, an oil ring expander 118 of the rail assembly 36 is illustrated as being generally circular in shape and having a gap 120 between a ring first end 122 and a ring second end 124. The oil ring expander 118 includes a plurality of upper and lower generally "U" shaped portions 126, 128, respectively, forming the generally circular shape of the oil ring expander 118. Each upper portion 126 includes a generally planar surface 130 adapted to be in mechanical communication with at least one rail 132, illustrated in FIGS. 24-26. The upper portion 126 is described in detail. However, in one exemplary embodiment, the lower portion 128 may also include similar elements. Specifically, the lower portion 128 may also include a generally planar surface (not shown) similar to the planar surface 130 for engaging an additional rail 132. The rail 132 is generally circumferential having a rail gap 133 for installing the rail into the piston assembly as illustrated in FIG. 11 A raised edge 134 of the oil ring expander 118 of FIG. 21 is proximate the surface 130 and interior ring 136 and functions to move the rail 132 between an engaged position and a disengaged position with the interior wall of the combustion chamber as further discussed below. The engaged position includes the gap 120 being between the ring first end 122 and the ring second end 124 and widened a predetermined distance. The disengaged position includes having the gap 120 minimized.

Referring now to FIG. 1, working in concert, as described, with the oil ring expander 118 is at least one rail 132. In one exemplary embodiment, the oil ring expander 118 is positioned between the rails 132 within the groove 48. The connecting rod 42 oscillates the second ends 72 of the lever arms 64, 66 between opposing ends 122 and 124 of the oil ring expander 118. The opposing ends 122 and 124 may be rounded and polished so as to avoid interference with the movements of the lever arms 64, 66.

To the extent that today's engines may rotate at speeds approaching 5000 to 6000 revolutions per minute, it is desirable that the expander be of a relatively high grade material having a superior capability for avoiding wear. For this purpose, normally high grade stainless steel materials used for expanders may be nitrided. Other hardening means are contemplated to fall within the scope of the present invention.

The embodiments described herein further contemplate movement of the lever arms 64 and 66 to produce a maximal gap spacing between the ends 122 and 124 of the oil ring expander at peak velocity, i.e., during downward stroke movements of the piston assembly 32 (often referred to as expansion and intake strokes). Assuming the radial piston ring load is maximized upon the downward strokes, the remaining cyclic conditions of pressure on the cylinder walls will be less than maximum. As a result, fuel efficiency can be realized because the average value of friction on the walls will be lower than afforded by today's state-of-the-art piston rings.

In operation, the lever arms 64 and 66 are mechanically actuated in a radial motion by connecting rod pins 80 attached to the connecting rod 42, increasing the stress on the oil ring expander 118 varying the tension. The pins 80 are disposed within the slots 90 of the lever arms 64, 66 and are secured in the pin holes 76, 78 of the connecting rod 42. The slots 90 are positioned such that the motion of the connecting rod 42 causes the lever arms 64, 66 to move in a radial motion. The lever arms 64, 66 are secured relative to the pivot apertures 60 of the piston 38 and protrude into the compression mechanism aperture 68.

The oil ring expander 118 includes ends 122 and 124 that abut the tabs 105 of the lever arms 64, 66. When the connecting rod motion occurs, the lever arms 64, 66 move the ends 122 and 124 outwardly widening the gap 120 of the oil ring expander 118 on the downstrokes and relaxing the oil ring expander 118 on the upstrokes. Increasing and decreasing the gap 120 increases and decreases its stress causing changes to the radial force of the rails 132 on the engine bore surface. The rails 132 increase force on the engine bore surface on the downstroke and increase the scraping efficiency of the oil downwardly. The rails 132 having a decreased force on the engine bore surface on the upstroke decreases the scraping efficiency of oil upwardly.

The described operation optimizes control of oil lost to the combustion chamber while decreasing the rail 132 friction. This consequently increases the fuel economy of the engine.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A piston assembly comprising:
   a connecting rod;
   a piston head in operational communication with said connecting rod, said piston head having a circumferential groove extending inwardly from an exterior surface of said piston head, said piston head having a compression mechanism aperture disposed proximate said groove;
   an oil ring expander disposed generally within said groove, said expander including a gap between a first expander end and a second expander end, said gap being proximate said compression mechanism aperture; and at least one lever arm in mechanical communication with said connecting rod, said at least one lever arm having a tab disposed between said first expander end and said second expander end;

wherein said at least one lever arm is pivotally secured to said piston head.

2. The piston assembly of claim 1, wherein said oil ring expander includes a plurality of generally "U" shaped portions forming a generally circular ring.

3. The piston assembly of claim 1, further including at least one rail in mechanical communication with said oil ring expander.

4. The piston assembly of claim 1, wherein said connecting rod includes at least one rod pin.

5. The piston assembly of claim 1, wherein said connecting rod includes at least one rod pin hole securing at least one rod pin.

6. The piston assembly of claim 5, wherein said at least one lever arm includes a slot in mechanical communication with said at least one rod pin.

7. The piston assembly of claim 6, wherein said connecting rod is in operational communication with said oil ring expander.

8. The piston assembly of claim 1, wherein said tab selectively expands said gap during a downstroke of a reciprocal movement of said connecting rod.

9. The piston assembly of claim 1, wherein said connecting rod includes at least one rod pin and at least one rod pin hole securing said at least one rod pin, said rod pin disposed within a slot of said at least one lever arm.

10. A piston assembly comprising:
a connecting rod;
a piston head in operational communication with said connecting rod, said piston head having a circumferential groove extending inwardly from an exterior surface of said piston head, said piston head having a compression mechanism aperture disposed proximate said groove;
an oil ring expander disposed generally within said groove, said expander including a gap between a first expander end and a second expander end, said gap being proximate said compression mechanism aperture;
a pair of lever arms in mechanical communication with said connecting rod, each of said lever arms having a tab disposed between said first expander end and said second expander end, and each of said two lever arms having a slot for selectively accepting a connecting rod pin;

whereby said connecting rod pin is secured to said connecting rod for selectively moving said oil ring expander during reciprocal movement of said connecting rod;
wherein each of said two lever arms are pivotally secured to said piston head.

11. The piston assembly of claim 10, wherein said oil ring expander includes a plurality of generally "U" shaped portions forming a generally circular ring.

12. The piston assembly of claim 10, further including at least one rail in mechanical communication with said oil ring expander.

13. The piston assembly of claim 10, wherein said connecting rod includes at least one rod pin hole securing at least one connecting rod pin.

14. The piston assembly of claim 10, wherein said connecting rod is in operational communication with said oil ring expander.

15. The piston assembly of claim 10, wherein said tabs selectively expand said gap during a downstroke of a reciprocal movement of said connecting rod.

16. The piston assembly of claim 10, wherein said connecting rod includes a first rod pin and a first rod pin hole securing said first rod pin, said first rod pin disposed within a slot of a first one of said two lever arms.

17. A method of expanding an oil ring expander of a piston comprising the steps of:
providing a connecting rod;
placing a piston head in operational communication with said connecting rod, said piston head having a circumferential groove extending inwardly from an exterior surface of said piston head;
installing an oil ring expander generally within said groove, said expander having a gap between a first expander end and a second expander end;
pivotally securing two lever arms to said piston head, said lever arms being in mechanical communication with said connecting rod, each of said two lever arms having a tab disposed between said first expander end and said second expander end, and each of said two lever arms having a slot for selectively accepting a connecting rod pin; and
expanding said gap during a downstroke of a reciprocal movement of said connecting rod.

18. The method of claim 17, including positioning at least one rail in mechanical communication with said oil ring expander.

19. The piston assembly of claim 16, wherein said connecting rod includes a second rod pin and a second rod pin hole securing said second rod pin, said second rod pin disposed within a slot of a second one of said two lever arms.

* * * * *